United States Patent
Wiens

(10) Patent No.: US 10,428,793 B2
(45) Date of Patent: Oct. 1, 2019

(54) ROTOR AND METHOD OF ADJUSTING AN ANGLE OF A ROTOR BLADE ON A ROTOR

(71) Applicant: TECHNISCHE UNIVERSITÄT BERLIN, Berlin (DE)

(72) Inventor: Staffan Wiens, Berlin (DE)

(73) Assignee: Technische Universitat Berlin (DE)

(*) Notice: Subject to any disclaimer, the term of this patent is extended or adjusted under 35 U.S.C. 154(b) by 423 days.

(21) Appl. No.: 15/089,969

(22) Filed: Apr. 4, 2016

(65) Prior Publication Data

US 2016/0298602 A1    Oct. 13, 2016

(30) Foreign Application Priority Data

Apr. 7, 2015    (DE) .................. 10 2015 105 249

(51) Int. Cl.
*F03D 7/02* (2006.01)
*F03D 80/70* (2016.01)
(Continued)

(52) U.S. Cl.
CPC ......... *F03D 7/0224* (2013.01); *F03D 1/0675* (2013.01); *F03D 1/0691* (2013.01);
(Continued)

(58) Field of Classification Search
CPC .... F03D 1/0675; F03D 1/0691; F03D 7/0224; F03D 7/0204; F03D 7/04; F05B 2260/507; F05B 2260/70; F05B 2260/71; F05B 2260/74; F05B 2260/75; F05B 2260/76; F05B 2260/79

See application file for complete search history.

(56) References Cited

U.S. PATENT DOCUMENTS

| 149,581   | A * | 4/1874 | Fargo ........... F03D 7/0208 417/35 |
| 2,283,774 | A * | 5/1942 | Thompson ..... B63H 3/008 416/140 |

(Continued)

FOREIGN PATENT DOCUMENTS

| DE | 743890 C | 1/1944 |
| DE | 202009012104 U1 | 11/2009 |

(Continued)

OTHER PUBLICATIONS

Machine translation of FR2401331.*

*Primary Examiner* — Richard A Edgar
*Assistant Examiner* — Brian O Peters
(74) *Attorney, Agent, or Firm* — Harness Dickey

(57) ABSTRACT

The present disclosure refers to a rotor (1) comprising a rotor blade (3), a hub (2), on which the rotor blade (3) is held by means of a bearing, and an adjustment device (7, 8, 10), in which a coupling component (7) arranged at the foot (5) of the rotor blade (3) is mounted in a guide (10) arranged on an adjustment component (8), such that by means of a displacement of the adjustment component (8) axially with respect to the axis of rotation (11) of the rotor of the hub (2) a pitch angle of the rotor blade can be altered, wherein the guide (10) runs at an inclination to the axis of rotation (11) of the rotor, at least during the axial displacement of the adjustment component (8). Also disclosed is a method for adjusting a pitch angle of a rotor blade.

12 Claims, 4 Drawing Sheets

Figure 1:
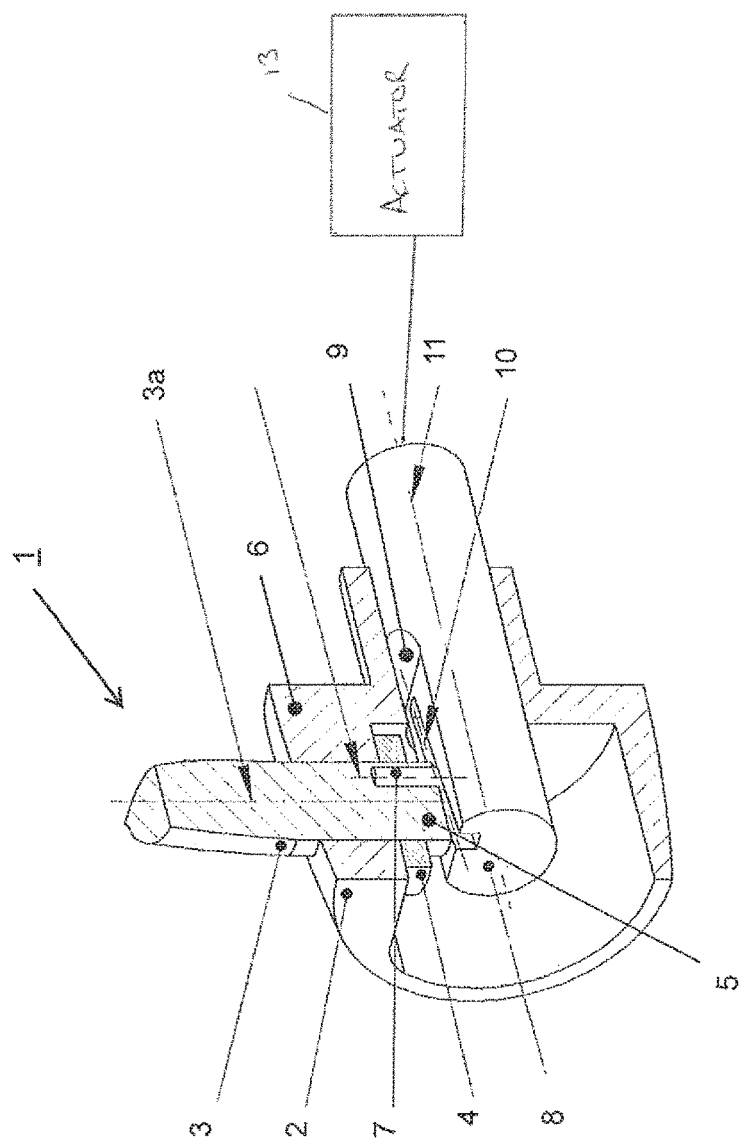

(51) Int. Cl.
  *F03D 1/06*  (2006.01)
  *F03D 7/04*  (2006.01)

(52) U.S. Cl.
  CPC .............. *F03D 7/04* (2013.01); *F03D 80/70* (2016.05); *F05B 2240/221* (2013.01); *F05B 2260/507* (2013.01); *F05B 2260/964* (2013.01); *Y02E 10/721* (2013.01); *Y02E 10/723* (2013.01)

(56) References Cited

U.S. PATENT DOCUMENTS

| | | | | |
|---|---|---|---|---|
| 3,709,187 | A * | 1/1973 | Marco | B63H 3/04 416/130 |
| 4,490,093 | A * | 12/1984 | Chertok | F03D 7/0224 416/152 |
| 8,439,640 | B2 * | 5/2013 | Arel | B64C 11/38 416/117 |
| 9,476,311 | B2 * | 10/2016 | Krackhardt | B63H 3/06 |
| 2010/0014976 | A1 | 1/2010 | Arel et al. | |
| 2011/0286842 | A1 * | 11/2011 | Danielson | B64C 11/306 416/1 |
| 2013/0142653 | A1 * | 6/2013 | Krackhardt | B63H 3/06 416/153 |
| 2014/0369836 | A1 | 12/2014 | Clark et al. | |

FOREIGN PATENT DOCUMENTS

| | | | | |
|---|---|---|---|---|
| DE | 112012001182 | T5 | 12/2013 | |
| DE | 102013008218 | A1 | 11/2014 | |
| EP | 1076590 | A1 | 2/2001 | |
| EP | 2597304 | | 5/2013 | |
| FR | 2401331 | * | 2/1977 | ............... F03D 7/04 |
| FR | 2401331 | A1 | 3/1979 | |
| JP | H0835482 | A | 2/1996 | |
| WO | WO-8300195 | A1 | 1/1983 | |

\* cited by examiner

ROTOR AND METHOD OF ADJUSTING AN ANGLE OF A ROTOR BLADE ON A ROTOR

CROSS-REFERENCE TO RELATED APPLICATIONS

This application claims priority to German application No. 10 2015 105 249.0 filed Apr. 7, 2015. The disclosure of the above application is incorporated herein by reference.

The invention concerns a rotor, together with a method for adjusting a pitch angle of a rotor blade on the rotor.

BACKGROUND

Rotors are deployed, for example, in wind turbines. Here the rotors usually have a hub design. For the rotor blades a pitch angle, or blade setting angle, also designated as a pitch angle, can be altered. By this means the power absorbed by the rotor can be matched to the operating conditions ("pitch hub"). In particular, a protection from overload can be implemented in this manner Existing systems are often complicated in build and are only suitable for wind turbines above a certain size. In particular, suitable mechanisms for small wind turbines and models of wind turbines are not widely available.

In the document DE 20 2009 012 104 U1 is described a design of a small wind turbine, in which the adjustment of the pitch angle of the rotor blades is implemented utilising a slide block arranged coaxially with the hub, which is connected with the rotor blades via articulated levers. The design as embodied with linkages and rods leads to a required size for the hub, which cannot be further reduced, even for small rotors. This is a particular disadvantage if the surface area taken up by the hub is large in comparison to the whole rotor surface area. A further disadvantage is that the link rods have a negative effect on the aerodynamics of the rotor. Protective cladding (a spinner) would be the current solution to prevent this, but this reduces the effective proportion of the rotor surface area for power output.

A more compact design of a rotor with an alterable blade setting angle is described in the document EP 1 076 590 B1. In one embodiment the alteration of the blade setting angle takes place by means of the axial displacement of a means of translation; a mounting is let into the axial centre of the means of translation, as a result of which levers attached to the foot of the rotor blades are moved such that the rotor blades rotate. In this design the disadvantage is that a relatively small axial displacement of the means of translation leads to a large alteration of the blade setting angle, which in practice leads to inaccuracies in the setting of the blade setting angle. This may be acceptable for rotors of model aircraft, towards which this design of known art is particularly directed, as long as the blade setting angle is not altered during operation; instead a desired pitch angle (=pitch of the propeller) is set just once before the aircraft is operated.

SUMMARY

The task of the invention is to specify a rotor together with a method for adjusting a pitch angle of a rotor blade on the rotor, in which the adjustment of the blade setting angle is enabled in a simple and efficient manner. At the same time, a compact build is to be maintained.

The task is achieved by means of a rotor in accordance with the independent claim 1. Furthermore a method is created for adjusting a pitch angle of a rotor blade on the rotor in accordance with the independent claim 12. Configurations are the subject matter of subordinate dependent claims.

In accordance with one aspect a rotor is created, which has a rotor blade, together with a hub, on which the rotor blade is held by means of a bearing. Furthermore, an adjustment device is provided in which a coupling component arranged at the foot of the rotor blade is mounted in a guide arranged on an adjustment component, such that by means of displacement of the adjustment component axially with respect to the rotor axis of the hub a pitch angle of the rotor blade can be altered. The guide runs, at least during the axial displacement of the adjustment component, at an inclination to the axis of rotation.

In accordance with a further aspect a method is provided for adjusting a pitch angle of a rotor blade, which is held on a hub of a rotor by means of a bearing. In the method a coupling component arranged at the foot of the rotor blade is mounted in a guide arranged on an adjustment component of an adjustment device, and the adjustment component is displaced axially with respect to the axis of rotation of the rotor, wherein the coupling component is hereby guided in the guide, as a result of which a pitch angle of the rotor blade is altered. The guide runs, at least during the axial displacement of the adjustment component, at an inclination to the axis of rotation.

The coupling component engages with the guide set at an inclination, so as to be guided for purposes of altering the blade pitch angle. The coupling component takes the form, for example, of a pin arranged at the foot of the rotor blade or a roller mounted at the foot of the rotor blade. The guide can be embodied as a groove. The groove can be designed with a depth and/or width that either remains the same, or alters, along the guide.

The coupling component, in particular then embodied as a pin, can be arranged in an eccentric position at the foot of the rotor blade.

The rotor blade is mounted on the hub with the aid of the bearing, and can rotate about its own axis, such that the blade pitch angle can be adjusted by means of rotation about the blade's own axis. The adjustment device is configured so as to convert the axial displacement of the adjustment component into a rotation of the rotor blade. The axial displacement of the adjustment component can be executed independently of any ancillary rotational movement of the adjustment component.

The guide runs at an inclination to the axis of rotation, in particular in the direction of view from above onto the guide.

In the various axial displacement positions the adjustment component can be at least partially accommodated in the hub in each case. The adjustment device can be wholly or partially arranged in the hub.

The bearing can be arranged on an inner face of the hub. The foot of the rotor blade can pass through an opening in the bearing and can extend beyond the bearing, on a side of the bearing facing towards the adjustment component. The rotor blade, in particular the foot of the rotor blade, can be accommodated in a form fit in an assigned mounting of the huh and/or bearing.

The adjustment device can have an actuator, which couples onto the adjustment component. The actuator provides a drive force, which can be introduced for purposes of axial displacement of the adjustment component. The actuator can be embodied as a linear actuator. When adjusting or altering the blade pitch angle of the rotor blade, a linear movement of the adjustment component in the axial direction of the rotor axis of rotation is effected with the actuator.

The adjustment component can be formed on a rotor shaft, which is secured against rotation relative to the hub. The adjustment component can be formed by means of a rotor shaft that can be displaced axially. In this or other forms of embodiment the adjustment component can be embodied in one piece or several pieces.

In a rotor-bearing unit, a hub-side bearing and a shaft-side bearing can be formed, between which a bearing separation distance can be adjusted. By altering the bearing separation distance the axial displacement of the adjustment component can be altered.

A linear actuator can be provided and equipped so as to adjust the bearing separation distance.

A paddle can be provided, which in operation is subjected to wind pressure. The paddle can couple onto the adjustment component. By virtue of the subjection to wind pressure, the adjustment component can then be axially displaced. The paddle can alternatively or additionally be connected with the rotor-bearing unit such that the bearing separation distance is adjusted as a function of wind pressure. The paddle can couple directly onto the adjustment component, that is to say, in particular without the involvement of the rotor-bearing unit. The paddle and/or the rotor-bearing unit can be coupled with a spring-damper system and/or another restorative device.

By this means the blade pitch angle can be altered with increasing wind velocity, such that the power absorption of the rotor is reduced, and vice versa, that is to say, with reducing wind velocity it can be increased once again.

The rotor-bearing unit can be coupled with a spring-damper system, such that the rotor-bearing unit is moved as a result of a rotor thrust against the spring-damper system. In strong wind the whole rotor is moved by this means relative to the adjustment component, as a result of which an alteration of the blade pitch angle is brought about, which limits the power absorption of the rotor. In light wind the displacement of the rotor and the associated reduction in power is cancelled out by means of the restorative forces of the spring-damper system.

The guide can be arranged in a flattened surface region of the adjustment component.

The guide can have an insertion opening, which is formed on the end face of the adjustment component.

At least one other rotor blade can be arranged in a comparable manner to the rotor blade, and to this end is displaced on the hub along the periphery of the hub. The plurality of rotor blades can be arranged at equidistant separations along the periphery of the hub. For example, three or four rotor blades can be provided.

The adjustment device can be equipped so as to adjust the respective blade pitch angle synchronously for the rotor blade and the at least one other rotor blade. To this end each rotor blade at its foot can be fitted with a coupling component, which is mounted in the assigned guide on the adjustment component, which runs at an inclination to the axis of rotation of the rotor.

In one configuration the inclined location or position of the guide with reference to the axis of rotation can be embodied such that in the direction of view from above onto the hub the guide and the axis of rotation subtend an acute angle, for example in the direction of view along the rotor blade.

In conjunction with the method for adjusting the pitch angle of the rotor blade on the rotor the configurations previously elucidated can be provided accordingly.

In the method provision can be made for the pitch angle of the rotor blade to be altered during the rotational operation of the rotor.

The rotor can be designed as the rotor of a wind turbine, or as a propeller for purposes of driving a motor-driven aircraft. An embodiment as a ship's propeller, or a free-running propeller of a hydroelectric power station, in particular a propeller that is not arranged in a pipe, can also be provided.

DESCRIPTION OF EXAMPLES OF EMBODIMENT

In what follows other examples of embodiment are elucidated with to a FIGURE,

The single FIGURE shows a representation in perspective of a rotor 1 in cross-section. A rotor blade 3 is held on a hub 2 by means of a bearing 4. Here a foot 5 of the rotor blade 3 penetrates a wall 6 of the hub 2, and also the bearing 4. At the foot 5 of the rotor blade 3 is arranged a coupling component 7, embodied in the example of embodiment as a pin. The coupling component 7, which can also be designated as a lever component, is eccentrically arranged with respect to the longitudinal axis of the rotor blade.

Partially inserted into the hub 2 is an adjustment component 8, which in the form of embodiment shown is in the form of a rotor shaft. In a flattened surface region 9 of the adjustment component 8 is arranged a guide 10, which in the form of embodiment shown is designed as a groove, or a mounting. The coupling component 7 engages with the guide 10. The guide 10 is set at an inclination to the axis of rotation 11 of the rotor. In one configuration the inclined location or position of the guide 10 with respect to the axis of rotation 11 is embodied such that in the direction of view from above onto the hub 2 the guide and 10 and the axis of rotation 11 of the rotor subtend an acute angle, for example in the direction of view along the rotor blade 3.

The rotor shaft, which can be axially displaced, is arranged in the interior of the hub 2; this shaft is secured that it cannot rotate with respect to the hub 2, that is to say, it rotates with the rotor blade 3 and the hub 2. The rotor blade 3 is mounted on the hub 2 such that it can rotate about its own axis 3a. By means of axial displacement of the adjustment component 8 embodied as a rotor shaft, the rotor blade 3 is rotated about its own axis. For this purpose a guide 10 is incorporated into the adjustment component 8 for each rotor blade 3; the centre line of each guide 10 is arranged, in the direction of view from above, pivoted at an acute angle to the axis of rotation 11 of the rotor (inclined position).

In the guide 10 runs the respective coupling component 7, which sits in the foot 5 of the corresponding rotor blade 3. The axis of the coupling component 7 is arranged eccentrically with respect to the point of rotation of the rotor blade 3, and parallel to the rotor blade axis. By this means, dependent upon the axial position of the adjustment component 8 embodied as a rotor shaft, a particular lateral position of the coupling component 7 ensues, and with it a particular blade setting angle of the rotor blade 3.

In one design the adjustment of the blade setting angle, that is to say, the axial displacement of the rotor shaft, takes place by means of a linear actuator. To this end the rotor shaft is mounted in the hub 2 such that it can be displaced axially. The rotor shaft can be produced from a suitable material such that the forces to overcome friction can be as small as possible.

The rotor mounting can consist of a fixed bearing, which supports the hub 2 in a housing, together with a bearing that is fixed in position on the shaft, and is connected with the linear actuator in a suitable manner. Here a generator for purposes of converting rotational energy into electrical energy can either be coupled to the rotor shaft and thus also axially displaced with the latter, or can be connected to the hub 2 and fitted with a hollow shaft, through which the rotor shaft passes, or can be connected with the hub 2 by means of a suitable geared transmission.

In an alternative form of embodiment the wind pressure is utilised so as to achieve the axial positioning of the adjustment component 8 embodied as a rotor shaft relative to the hub 2. For this purpose the shaft can either be connected with a suitable mechanism with a paddle, which is acted upon by the wind, or the wind pressure on the rotor 1 itself is utilised so as to displace the rotor blades including the hub 2 relative to the shaft, which in this arrangement is fixed in position. In both cases the axially displaceable adjustment component 8 can be supported against the wind pressure by means of a spring-damper system.

With the rotor 1 small wind turbines in particular can be cost-effectively embodied with a blade angle adjustment mechanism. In a wind turbine with a blade angle adjustment mechanism, protection from overload can take place by means of adjustment of the blade setting angle, as a result of which productive operation is also possible at high wind velocities.

The rotor 1 can also be utilised for model aircraft, drones, or smaller motorised aircraft, such as, for example, ultralight aircraft, or gliders with an ancillary drive. In climbing flight, for example, quite different velocities ensue compared with (motor-aided) gliding, wherein only by an adaptation of the pitch in the various operational situations can the maximum energy efficiency be achieved. By this means fuel can be saved, when compared with a propeller in which the pitch is only adjusted once as a compromise between the operational situations occurring.

The features disclosed in the above description, and the claims, together with the FIGURE, can be of significance, both individually and also in any combination, for the implementation of the various embodiments.

The invention claimed is:

1. A rotor with:
   a rotor blade,
   a hub on which a rotor blade is held by a bearing, and
   an adjustment device comprised of a coupling component and a guide, the coupling component is arranged at a foot of the rotor blade and is mounted in the guide formed on a rotor shaft, wherein the rotor shaft is a monolithic member which is secured against rotation relative to the hub, such that by displacement of the rotor shaft axially with respect to the axis of rotation of the rotor of the hub, a pitch angle of the rotor blade can be altered, wherein the guide runs, at least during the axial displacement of the rotor shaft, at an inclination to the axis of rotation of the rotor.

2. The rotor in accordance with claim 1, wherein the adjustment device has an actuator, which couples onto the rotor.

3. The rotor in accordance with claim 1 further includes a rotor-bearing unit having a hub-side bearing and a shaft-side bearing, between which a bearing separation distance can be adjusted.

4. The rotor in accordance with claim 3, further includes a linear actuator, which is equipped so as to adjust the bearing separation distance.

5. The rotor in accordance with claim 1, wherein a paddle coupled to the rotor shaft, which in operation is subjected to wind pressure.

6. The rotor in accordance with claim 3, wherein the rotor-bearing unit is coupled with a spring-damper system, such that the rotor-bearing unit is moved as a result of a rotor thrust against the spring-damper system.

7. The rotor in accordance with claim 1, wherein the guide is arranged in a flattened surface region of the rotor shaft.

8. The rotor in accordance with claim 1, wherein the guide has an insertion opening, which is formed on the end face of the rotor shaft.

9. The rotor in accordance with claim 1, wherein at least one other rotor blade is displaced on the hub along the periphery of the hub.

10. The rotor in accordance with claim 9, wherein the adjustment device is equipped so as to adjust the respective pitch angle synchronously for the rotor blade and the at least one other rotor blade.

11. A method for adjusting a pitch angle of a rotor blade which is held on a hub of a rotor by a bearing, wherein in the method
   a coupling component arranged at the foot of the rotor blade is mounted in a guide formed on a rotor shaft, where the rotor shaft is a unitary member, and
   the rotor shaft is mounted axially with respect to an axis of rotation of the rotor, and the coupling component is hereby guided in the guide, as a result of which a pitch angle of the rotor blade is altered, wherein the guide runs, at least during the axial displacement of the rotor shaft, at an inclination to the axis of rotation of the rotor.

12. The method in accordance with claim 11, wherein the pitch angle of the rotor blade is altered during the rotational operation of the rotor.

* * * * *

UNITED STATES PATENT AND TRADEMARK OFFICE
CERTIFICATE OF CORRECTION

PATENT NO. : 10,428,793 B2
APPLICATION NO. : 15/089969
DATED : October 1, 2019
INVENTOR(S) : Staffan Wiens It is certified that error appears in the above-identified patent and that said Letters Patent is hereby corrected as shown below:

Column 1
Line 21     after "manner", insert --.--

Column 2
Line 35     delete "then" and insert --when-- therefor
Line 59     delete "huh" and insert --hub-- therefor Column 3
Line 26     after "device.", delete "¶"

Figure 2:
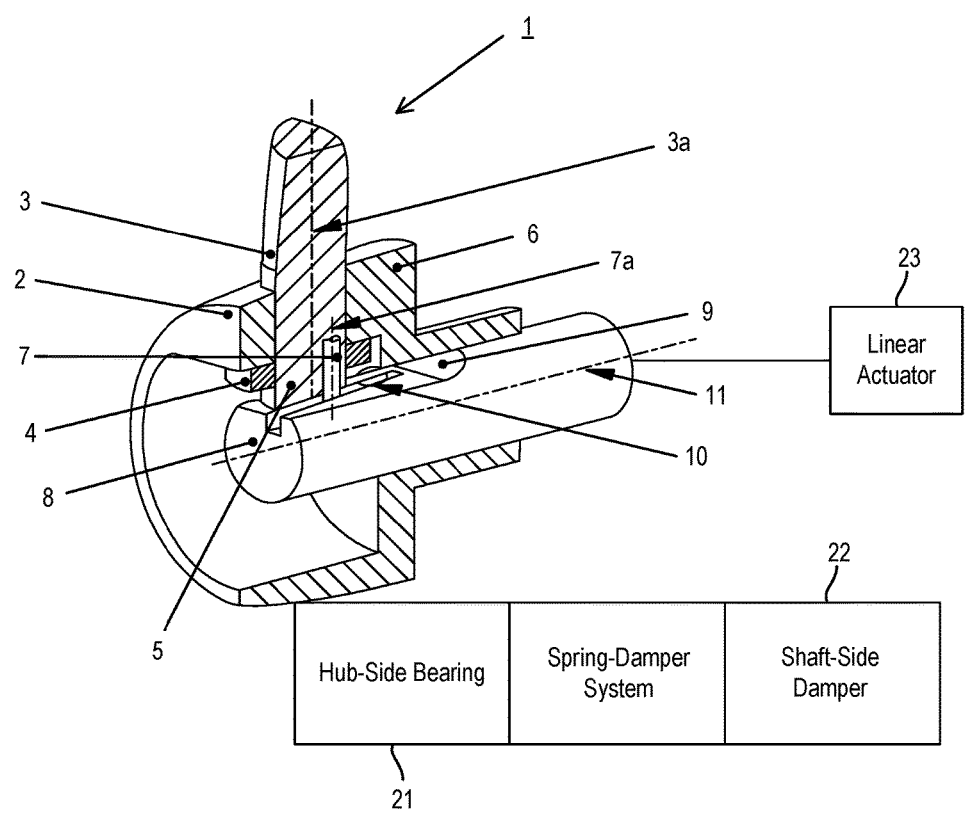
Figure 3:
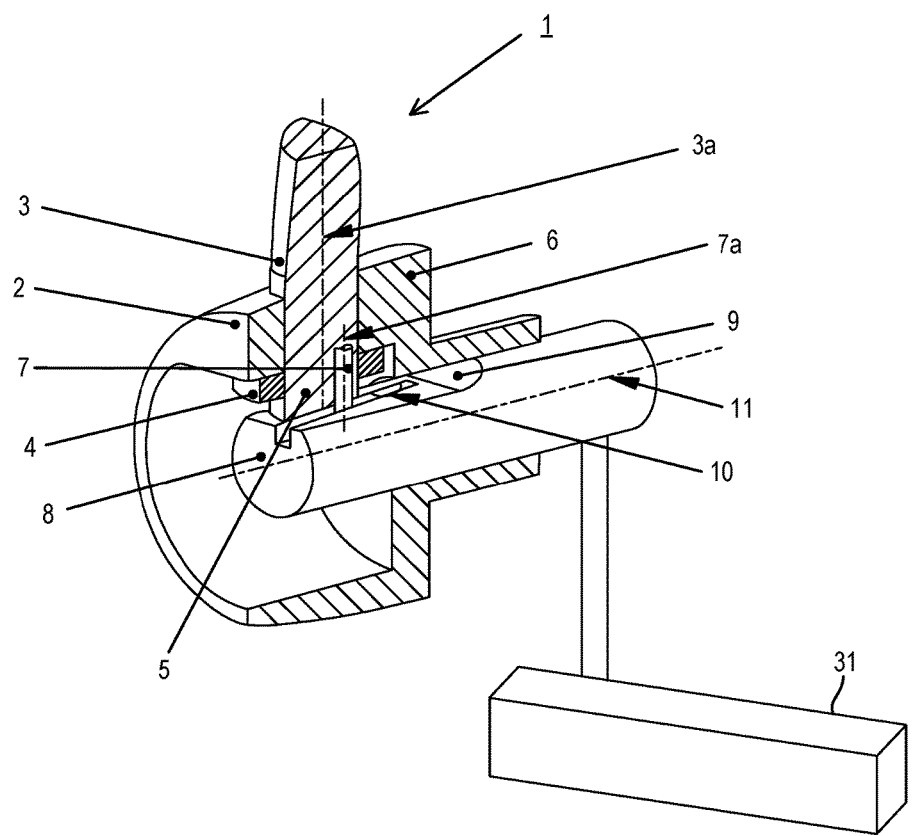
Figure 4:
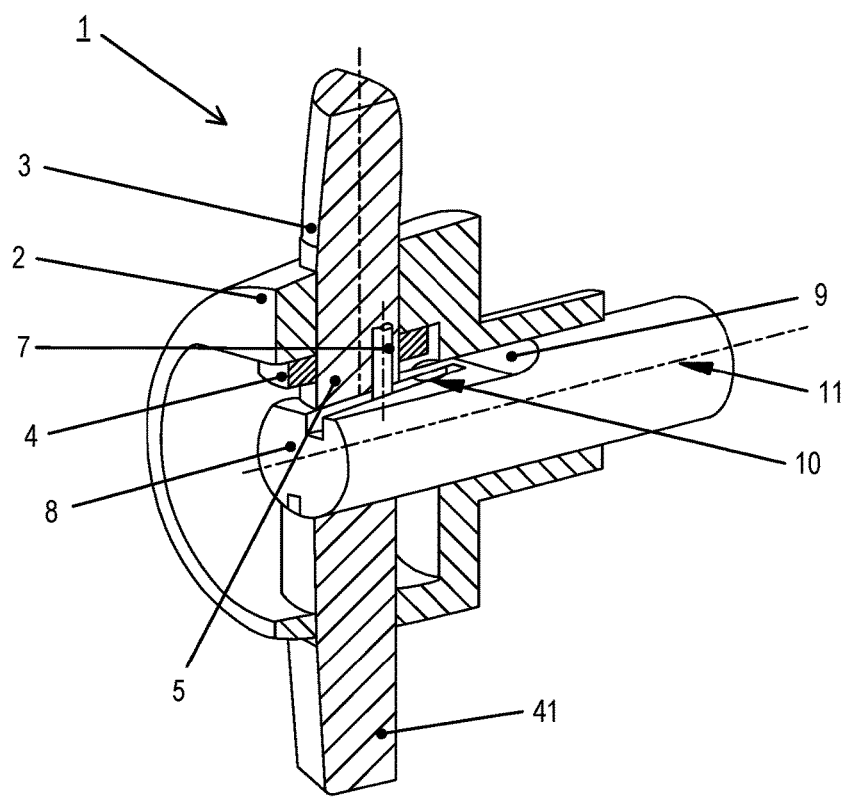

Column 4
Line 15     delete "to a FIGURE," and insert --reference to FIGS. 1-4.-- therefor
Line 16     delete "The single FIGURE" and insert --FIG. 1-- therefor
Line 36     after "guide", delete "and"
Line 63     delete "actuator." and insert --actuator 13.-- therefor Column 5
Line 15     delete "paddle," and insert --paddle 31 (see, FIG. 3),-- therefor
Line 38     after "occurring.", insert --¶FIG. 2 depicts an alternative embodiment of the rotor 1. In a rotor-bearing unit, a hub-side bearing 21 and a shaft-side bearing 22 can be formed between which a bearing separation distance can be adjusted. By altering the bearing separation distance, the axial displacement of the adjustment component can be altered. A linear actuator 23 can be provided and equipped so as to adjust the bearing separation distance.
It is readily understood that at least one other rotor blade 41 can be arranged in a comparable manner to the rotor blade as seen in FIG. 4. To this end, the rotor blade is disposed on the hub along the periphery of the hub.--
Line 40     delete "FIGURE," and insert --FIGS.,-- therefor Signed and Sealed this
Seventeenth Day of December, 2019

Andrei Iancu
*Director of the United States Patent and Trademark Office*